US006195736B1

(12) United States Patent
Lisle

(10) Patent No.: US 6,195,736 B1
(45) Date of Patent: Feb. 27, 2001

(54) METHOD FOR PAGING SOFTWARE WAVETABLE SYNTHESIS SAMPLES

(75) Inventor: Ronald Jay Lisle, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/428,833

(22) Filed: Oct. 28, 1999

Related U.S. Application Data

(62) Division of application No. 08/835,131, filed on Apr. 4, 1997.

(51) Int. Cl.[7] .............................. G06F 12/00

(52) U.S. Cl. .............................. 711/206; 711/202; 711/203; 84/603; 84/604; 84/605; 84/606; 84/607

(58) Field of Search .............................. 711/202, 203, 711/206; 84/603, 604, 605, 606, 607

(56) References Cited

U.S. PATENT DOCUMENTS

| | | | | |
|---|---|---|---|---|
| 5,675,762 | * | 10/1997 | Bodin et al. | 711/206 |
| 5,753,841 | * | 5/1998 | Hewitt | 84/604 |
| 5,847,304 | * | 12/1998 | Hewitt | 84/622 |
| 5,909,559 | * | 6/1999 | So | 710/127 |
| 5,987,584 | * | 11/1999 | Chambers et al. | 711/220 |

* cited by examiner

*Primary Examiner*—Do Hyun Yoo
*Assistant Examiner*—Mehdi Namazi
(74) *Attorney, Agent, or Firm*—Jeffrey S. LaBaw; Felsman, Bradley, Vaden, Gunter & Dillon, LLP

(57) ABSTRACT

Wavetables for a wavetable synthesizer are divided into nonpaged and paged segments. The nonpaged segments are page locked in system memory, so that the wavetable may beginning playing when referenced. The paged segments are paged into memory as needed, and may be paged out of memory when no longer required. The segmentation of the wavetable is determined based on the maximum data rate for the wavetable and a maximum paging delay for the system. Wavetable segmentation is automatically tuned by monitoring actual paging delays and, taking into account a margin for error, updating the value of the maximum paging delay used to determine the required size for a nonpaged wavetable segment. An aggressive margin for error may be employed where an alternative mechanism is provided for handling overruns of the nonpaged wavetable segments.

20 Claims, 4 Drawing Sheets

METHOD FOR PAGING SOFTWARE WAVETABLE SYNTHESIS SAMPLES

This is a Division of application Ser. No. 08/835,131, filed Apr. 4, 1997, currently pending

BACKGROUND OF THE INVENTION

1. Technical Field

The present invention relates in general to audio facilities in data processing system and in particular to audio wavetable handling in data processing systems. Still more particularly, the present invention relates to a method of paging audio wavetables into a system memory for a data processing system.

2. Description of the Related Art

Audio capabilities for data processing systems can be supported in a variety of manners. One method employs musical instrument digital interface (MIDI) wavetable synthesis, which is also employed in electronic musical instruments. In the wavetable technique, pulse code modulation (PCM) or compressed data of actual sounds are used to represent the desired waveform or the tone to be generated. This digitized recording, or "sample", of the desired tone may then be stored in a digital format in a memory, typically referred to as a wavetable. To recreate the tone, the digital waveform is retrieved from memory and converted from a digital format to an analog signal to generate the desired sound.

A PCM wavetable algorithm plays a recreated sound into a filter whose output can be modulated in a mixer according to a volume input. To conserve memory, a digitized representation of the desired sound may be looped. For such wavetables, the desired sound may then be generated for any length of time by starting at the beginning of the wavetable and, upon reaching the loop, repeatedly looping between the loop start and loop end for the desired period.

Regeneration of the desired tone from the stored digital representation is typically performed by a MIDI synthesizer, a process which controls the filter, mixer, and volume input described above. In the past, MIDI synthesizers in data processing systems employed dedicated hardware, such as an audio adapter or "sound card," or some specialized peripheral. However, wavetable synthesis is increasingly being performed on the data processing system host processor. Several companies already offer software MIDI synthesizer products, while others have announced release plans.

Software wavetable synthesizers typically include at least three modules: an interrupt handler, a timer, and applications calls. Current commercial software wavetable synthesizers generally require a substantial amount of system memory to hold the digitized samples of each sound to be played, currently ranging from ½ to 8 megabytes of system memory. Since the system memory holding the digitized samples must be available from within the interrupt handler, such memory is typically "locked," or retained continuously in memory while the software synthesizer is operating.

Locking wavetables into memory, as is done by current wavetable synthesizers, limits the memory resources available for other purposes while the software synthesizer is active. Also, the availability of system memory limits the number of wavetables which may be employed to generate a specific sound, and requires that the wavetables employed be small, low quality wavetables.

It would be desirable, therefore, to provide a mechanism for providing wavetables to a wavetable synthesizer with reduced system memory requirements, even with wavetables of the same quality. It would further be advantageous for the mechanism to permit the synthesizer to utilize higher quality wavetables and to utilize a very large number of wavetables without regard to wavetable size.

SUMMARY OF THE INVENTION

It is therefore one object of the present invention to provide improved audio facilities in data processing system.

It is another object of the present invention to provide improved audio wavetable handling in data processing systems.

It is yet another object of the present invention to provide a method of paging audio wavetables into a system memory for a data processing system.

The foregoing objects are achieved as is now described. Wavetables for a wavetable synthesizer are divided into nonpaged and paged segments. The nonpaged segments are page locked in system memory, so that the wavetable may beginning playing when referenced. The paged segments are paged into memory as needed, and may be paged out of memory when no longer required. The segmentation of the wavetable is determined based on the maximum data rate for the wavetable and a maximum paging delay for the system. Wavetable segmentation is automatically tuned by monitoring actual paging delays and, taking into account a margin for error, updating the value of the maximum paging delay used to determine the required size for a nonpaged wavetable segment. An aggressive margin for error may be employed where an alternative mechanism is provided for handling underruns of the paged wavetable segments.

The above as well as additional objects, features, and advantages of the present invention will become apparent in the following detailed written description.

DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
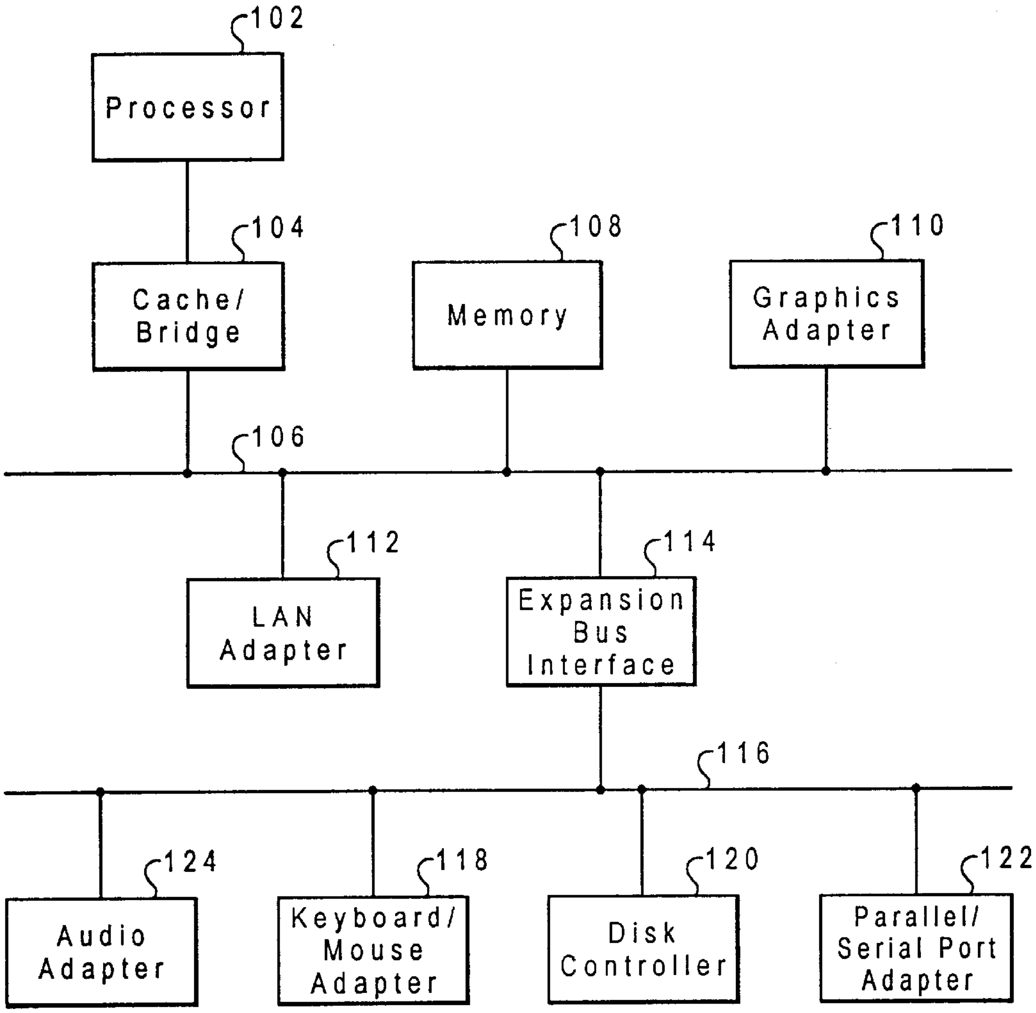
FIG. 1 depicts a data processing system in which a preferred embodiment of the present invention may be implemented.

With reference now to the figures, and in particular with reference to FIG. 1, a data processing system in which a preferred embodiment of the present invention may be implemented is depicted. The data processing system depicted includes a processor 102 connected to a level two cache/bridge 104, which is connected in turn to a local system bus 106. Local system bus 106 may be, for example, a peripheral component interconnect (PCI) architecture bus.

Also connected to local system bus in the depicted example are a main memory 108 and a memory-mapped graphics adapter 110.

Other memory mapped peripherals, such as local area network (LAN) adapter 112, may also be connected to local system bus 106. Expansion bus interface 114 connects local system bus 106 to input/output (I/O) bus 116. I/O bus 116 is connected to keyboard/mouse adapter 118, disk controller 120, and parallel/serial ports adapter 122. Also connected to I/O bus 116 in the example shown is audio adapter 124, to which speakers (not shown) may be connected for playing sounds.

Those of ordinary skill in the art will appreciate that the hardware depicted in FIG. 1 may vary for a particular system. For example, other peripheral devices, such as an optical disk drive and the like, also may be used in addition or in place of the hardware depicted. The depicted example is provided for the purpose of explanation only and is not meant to imply architectural imitations with respect to the present invention.

A data processing system in accordance with a preferred embodiment of the present invention includes a wavetable synthesizer, a program that translates digitized sound samples into analog signals. One of various commercial software wavetable synthesizers, such as Microsoft DirectX synthesizer, a product of Microsoft Corporation located in Redmond, Wash., or IBM SoftMIDI synthesizer, a product of International Business Machines Corporation located in Armonk, N.Y., may be employed if suitably modified. The software wavetable synthesizer is modified or created in accordance with the present invention. Additionally, the processes employed by the present invention may also be implemented in whole or in part in audio adapter 124.

Figure 2:
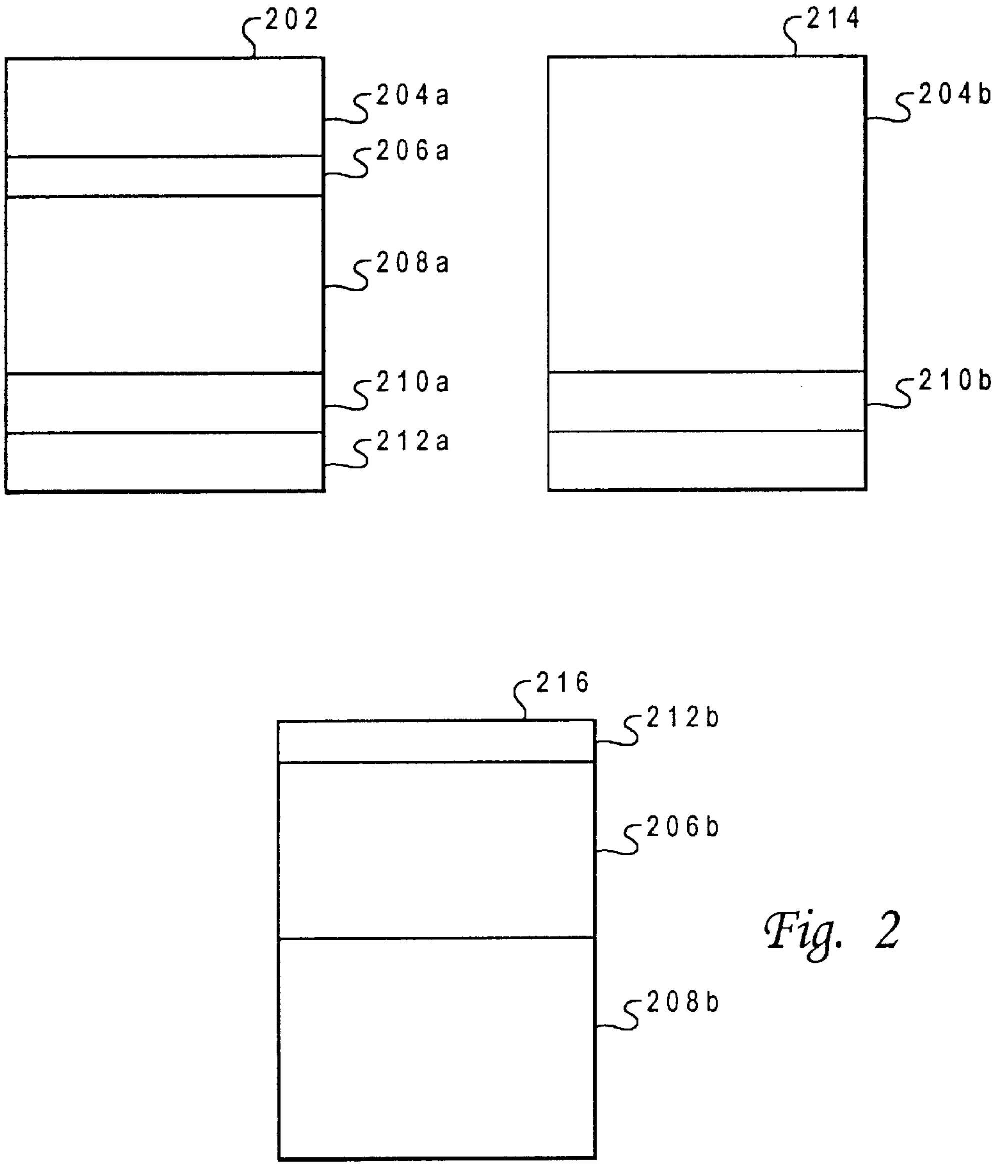
FIG. 2 is a block diagram of memory pages storing wavetables in a data processing system in accordance with a preferred embodiment of the present invention.

Referring to FIG. 2, a block diagram of memory pages storing wavetables in a data processing system in accordance with a preferred embodiment of the present invention is illustrated. A variety of operating systems utilize "paged" memory, in which data is loaded or unloaded from system memory in memory blocks of a specified size called "pages." The present invention takes advantage of characteristics of MIDI to allow most of the samples to be paged out of system memory when not required.

It is generally considered impossible to page wavetables because of the possibility that MIDI samples could be used asynchronously without prior warning. In reality, however, this is not the case. Wavetable samples are usually played from beginning to end, with a section at the end looped and played repeatedly. Paging is typically impossible during the interrupt handler segment of a wavetable synthesizer, but not during other portions such as the timer or application calls.

To allow wavetable samples to be paged, each sample is divided into two sections. A page 202 locked in system memory contains the first section of each wavetable sample so there will never be a page fault. The individual wavetable samples may contain notes or chords sampled from different instruments. Page 202 in the example shown includes sections 204*a*–212*a* of each wavetable forming a portion of the sound to be generated. Multiple locked pages may be employed to store the first wavetable sections 204*a*–212*a* if necessary and/or available. The size of these first sections 204*a*–212*a* is dependent in part on the size of a system memory page, which is system dependent. In a worst case, for example, the segment size must be sufficient to allow one tenth of a second to pass while the paged segment is being loaded and may be on the order of kilobytes. Since each wavetable has a portion 204*a*–212*a* locked in a system memory page 202, during an interrupt any wavetable may be safely referenced.

When one of the wavetable first sections 204*a*–212*a* is referenced, a flag is set to cause the second section, if any, of the referenced wavetable to be paged into memory. For example, if section 206*a* of a wavetable comprising sections 206*a* and 206*b* is utilized, page 216 containing section 206*b* may be paged into system memory to make section 206*b* available.

The actual paging may be performed from within any code segment of the wavetable synthesizer except the interrupt handler. As an extension, the actual MIDI data being received may be used to anticipate which wavetable samples will be needed. Various schemes have been proposed for anticipating the next note to be played. In fact, some audio cards require prior notice of which sample will be utilized. The present invention may employ such anticipatory schemes, but allows the samples to be played totally asynchronously in response to a key being pressed. The present invention also allows more general management capabilities anticipating memory requirements to be employed in lieu of anticipating the next note. For example, the Windows "CachePatches( )" function may be employed to load samples. This is the preferred approach if a page-safe timer mechanism for generating the waveforms is not available to the wavetable synthesizer. Additionally, some systems allow paging to be initiated from within the interrupt handler.

Using paged storage of large wavetables, or many wavetables, allows fully automatic retrieval of required wavetable data while supporting totally asynchronous operation in a wavetable synthesizer. The use of paged memory for wavetable storage requires that the beginning segment of each instrument's wavetable be locked into memory to allow the sound to begin playing without delay while the remainder of the wavetable is paged into memory.

The size of the wavetable segment locked in system memory depends on the paging performance of the data processing system, the current loading of the data processing system, and the maximum data rate of each individual instrument wavetable. These factors limit the benefits achieved by utilizing paged wavetables. In order to maximize the benefit for smaller wavetables, it is necessary to "tune" the size of the locked segment to be the smallest possible for each wavetable without inducing data underruns. The greatest benefit, however, is obtained by paging large wavetables. For example, it would be desirable to sample piano notes to decay without looping, a tone which may last 8–12 seconds. Each note would thus require a very large wavetable, and separate wavetables may be generated for each of the 88 notes.

Figure 3:
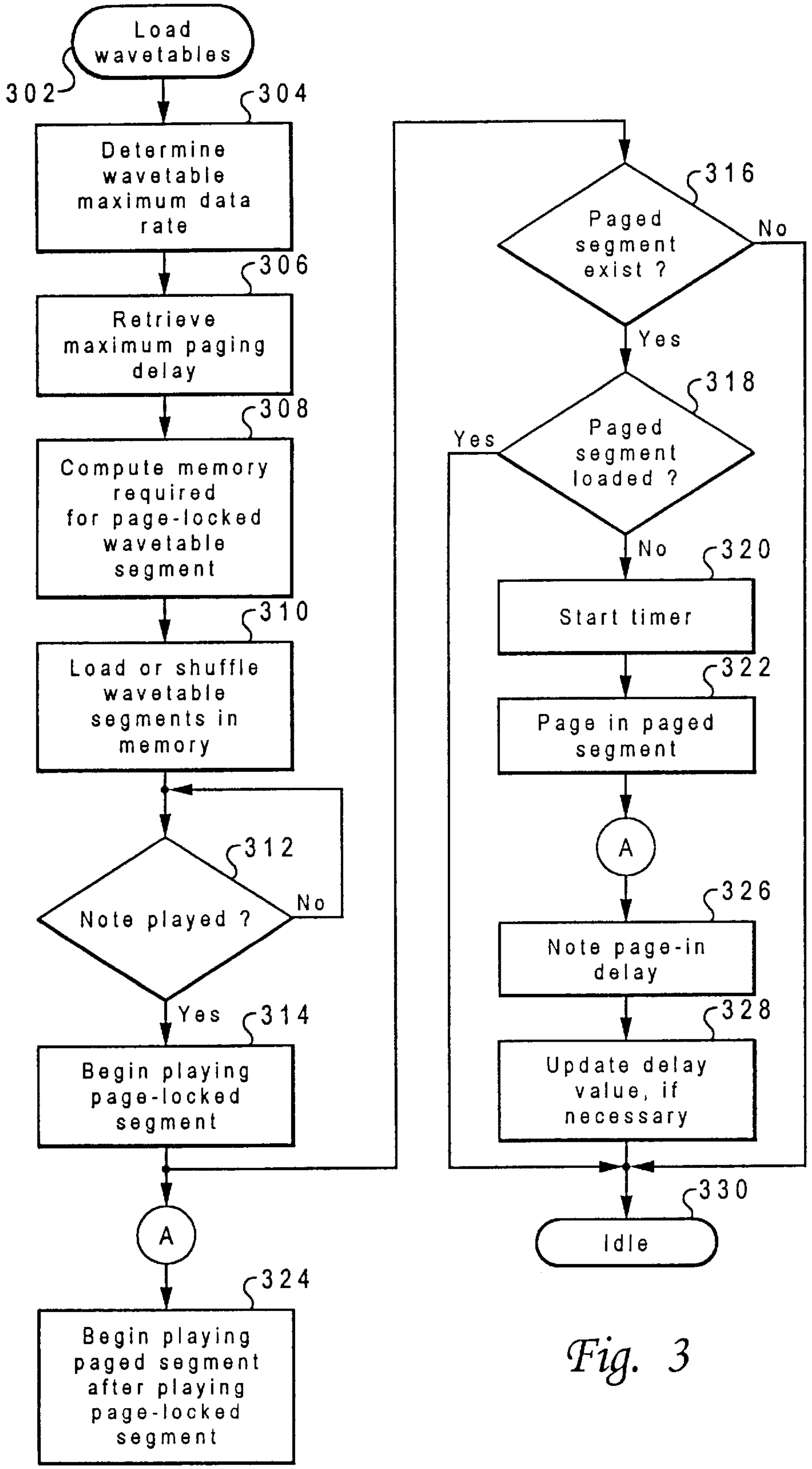
FIG. 3 depicts a high level flowchart for a process of paging wavetable segments in accordance with a preferred embodiment of the present invention.

With reference now to FIG. 3, a high level flowchart for a process of paging wavetable segments in accordance with a preferred embodiment of the present invention is depicted. Each wavetable may be loaded into locked system memory in one or two segments, depending on the size of the wavetable. Each wavetable includes at least a beginning or nonpaged segment, and may include an ending or paged segment.

The process begins at step 302, which illustrates receiving an instruction to load a wavetable or group of wavetables. The process then passes to step 304, which depicts determining the maximum data rate of a wavetable to be loaded. Each wavetable has an associated maximum data rate which may be calculated from the original pitch of the recorded instrument, the recording sample rate, and the maximum playback pitch of the instrument. This data already exists for any existing wavetable. The maximum data rate may be calculated from:

$$\text{max rate}=(\text{pitch}_{max}/\text{pitch}_{recorded})\ (\text{sample rate})\ (\text{bytes/sample})$$

where $\text{pitch}_{max}$ is the maximum pitch at which the sample will be replayed and $\text{pitch}_{recorded}$ is the pitch at which the sample was recorded. For piano samples such as those described above, $pitch_{max}$ will generally equal $pitch_{recorded}$. For other instruments, however, sampled notes may be replayed at higher or lower octaves. The maximum pitch may be determined by the highest note played, plus a margin for a vibrato effect, which is typically specified for a wavetable.

The process next passes to step 306, which illustrates determining a maximum paging delay. A system configuration parameter or a default value specifies a worst case paging delay for the system. If the parameter is not specified for a given system, the process may utilize a nominal default value of 100 ms for contemporary data processing systems. This is approximately 10 times the value expected to work for most systems.

The process then passes to step 308, which depicts calculating the amount of locked system memory which must be utilized for the beginning segment of the wavetable being loaded. This may be calculated by multiplying the wavetable's maximum data rate by the maximum paging delay, yielding the minimum amount of wavetable data required for the synthesizer to accommodate the paging delay.

The process next passes to step 310, which illustrates loading the wavetable, split into nonpaged and paged segments based on the calculated amount required to be locked in system memory. The nonpaged segment is loaded into a locked page of system memory, while the paged segment is loaded into a different memory page. The process of steps 304 through 310 is repeated for each wavetable to be loaded. The paged segments of-the wavetables need not be page aligned to the start of a memory page, and should be loaded into a minimum number of pages. Therefore, multiple paged segments for different wavetables may be loaded into a memory single page, if they fit. The process of steps 304–310 is also used to adjust wavetable segmentation when a new value for the paging delay is determined.

Most wavetable synthesizers already support multiple playback segments. All commercial wavetable synthesizers support looping of wavetable data. Therefore, only minimal changes will be required to the interpolating oscillator procedure of an existing wavetable synthesizer to support wavetables having multiple segments.

Once all of the wavetables are loaded, the process passes to step 312, which depicts a determination of whether a MIDI note is being played. If not, the process loops back to step 312 and continues polling for a note to be played. If so, however, the process proceeds to step 314, which illustrates beginning to play the page-locked segment of the corresponding wavetable, and then to step 316, which depicts determining whether a paged segment of the wavetable exists. If sufficiently small, the entire wavetable may have been loaded into locked memory. The entire wavetable need not be smaller than the computed data requirement for a nonpaged segment accommodating the paging delay, since a very small paged segment may not warrant separate storage.

If no paged segment exists for the corresponding wavetable, the process proceeds to step 330, which illustrates the process becoming idle, assuming that only one MIDI note was to be played by the process. Within a wavetable synthesizer, the process would more likely return to step 312 to poll for another MIDI note to be played.

Referring again to step 316, if a paged segment exists for the wavetable corresponding to the MIDI note played, the process proceeds instead to step 318, which illustrates a determination of whether the paged segment for the wavetable is already loaded. If so, the process passes to step 330, becoming idle or polling for another MIDI note as described above.

If the paged segment of the wavetable is not already loaded, however, the process proceeds instead to step 320, which depicts starting a page-in delay timer. The process then passes to step 322, which depicts paging in the paged segment of the wavetable utilizing the system's paging mechanism, and then (asynchronously) to step 324, which illustrates beginning play of the paged segment of the wavetable when the nonpaged segment is exhausted. The synthesizer will not begin playing the paged segment of the wavetable until the nonpaged segment is complete.

From step 322, the process next passes to step 326, which depicts noting the page-in delay, and then to step 328, which illustrates updating the maximum paging delay value, if necessary. The process finally passes to step 330, described above.

Those skilled in the art will recognize that variances from the process depicted in FIG. 3 may occur in a wavetable synthesizer. For example, a loop within a wavetable may span the boundary between the nonpaged and paged segments. Once the paged segment is loaded, however, the wavetable synthesizer may easily follow the loop through the nonpaged and paged segments. Additionally, a wavetable synthesizer may play multiple notes concurrently, either initiated simultaneously or in a staggered fashion. Thus, the process depicted must be modified to handle playing multiple notes as they are initiated, and terminating such notes. Moreover, memory pages containing paged wavetable segments not in use may be paged out of the system memory. All variations employing the basic process depicted are considered to be within the spirit and scope of the present invention.

Figure 4:
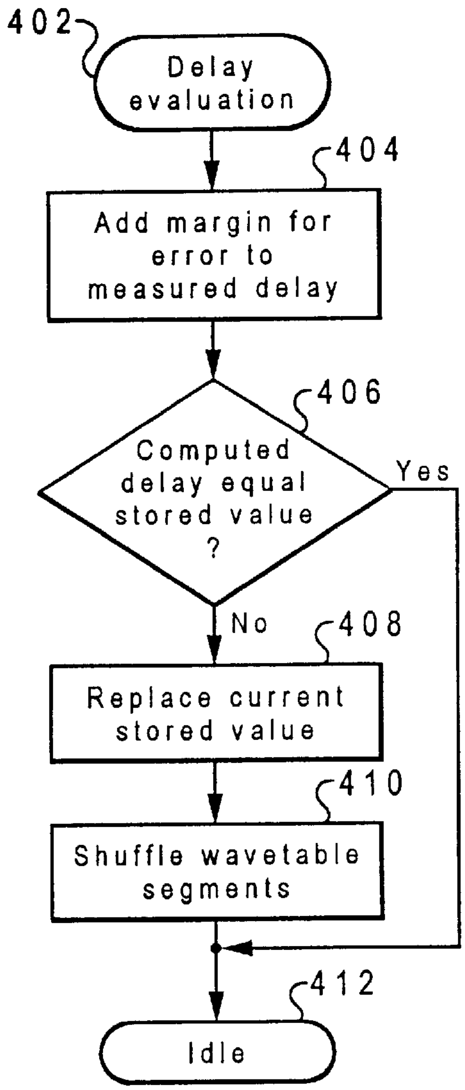
FIG. 4 is a high level flowchart for a process of automatically tuning wavetable segment paging in accordance with a preferred embodiment of the present invention.

Referring to FIG. 4, a high level flowchart for a process of automatically tuning wavetable segment paging in accordance with a preferred embodiment of the present invention is illustrated. Since paging performance varies substantially between different systems, page tuning must be separately performed for each individual system. Furthermore, system loading on any given system varies over time, affecting paging performance. Thus, on-going automatic wavetable paging tuning is preferred.

The process shown begins at step 402, which depicts initiation of the maximum paging delay evaluation, which was initially set to a configuration parameter or a default value. The evaluation may be initiated at regular intervals, such as, for example, once per second. Alternatively, the evaluation may be initiated when a measured paging delay differs from the paging delay value employed in calculations by a specified amount, such as, for example, a 25% difference over the current value.

Regardless of how initiated, the process passes to step 404, which depicts adding a margin of error to the measured paging delay to generate a computed page-in delay. The margin of error is selected to be sufficiently large to prevent overruns, exhaustion of the nonpaged segment of the wavetable before the paged segment is loaded. The margin of error selected represents a trade-off, since a larger margin of error decreases the possibility of overruns but increases the amount of system memory which must be locked for nonpaged wavetable segments.

The process next passes to step 406, which illustrates comparison of the measured delay plus the margin of error (computed page-in delay) to the current value of the maximum paging delay used to segment the wavetables. If the values equal, the process proceeds to step 412, which illustrates the process becoming idle until the next delay evaluation is initiated. If the values are not equal, however, the process proceeds instead to step 408, which depicts replacing the current value of the maximum paging delay with the measured value plus the margin of error. The process next passes to step 410, which illustrates shuffling the wavetable segments based on the new value of the maximum paging delay, and then to step 412, which depicts the process becoming idle as described above.

The process depicted allows the maximum paging delay to be automatically adjusted either downwardly or upwardly to accommodate changes in system loading. Variations may be introduced to the process. For example, where the delay evaluation is initiated on a periodic basis, the measured delay may actually be an average measured delay for a given period. Additionally, a range of variance between the computed paging delay and the current value (for example, 5%) may be tolerated before the current value is replaced. In this manner, the wavetable segments need not be shuffled each time the delay evaluation detects some minor difference between the computed paging delay and the current value of the maximum paging delay parameter used to segment the wavetables.

The process described above will serve to protect the wavetable synthesizer against overruns, also referred to as "audio underruns," provided a sufficient margin for error is utilized to prevent sudden system loading from causing underruns. More than simply causing the desired instrument tone to stop playing, underruns may result in a (potentially loud) audible "pop," since the wavetable as seen by the synthesizer ends abruptly.

As noted above, however, the margin for error employed represents a trade-off between preventing overruns and minimizing the amount of system memory which must be locked for the nonpaged wavetable segments. A more aggressive margin for error may be utilized if alternative mechanisms are available to handle underruns (exhausting the nonpaged wavetable segment).

Figure 5:
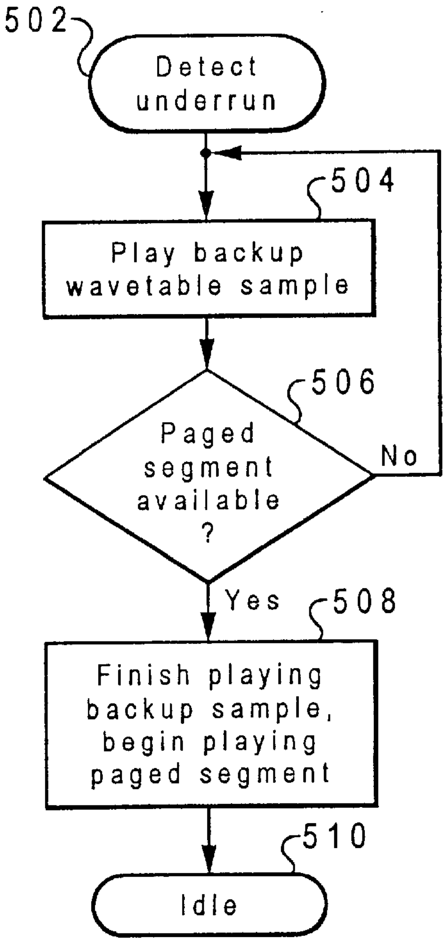
FIG. 5 depicts a high level flowchart for a process of handling overshoot while paging wavetable segments in accordance with a preferred embodiment of the present invention.

With reference now to FIG. 5, a high level flowchart for a process of handling underruns while paging wavetable segments in accordance with a preferred embodiment of the present invention is depicted. The process begins at step 502, which depicts detection of underruns by the wavetable synthesizer. The detection preferably includes some anticipation by the wavetable synthesizer, which may begin preparing to handle underruns as the end of the nonpaged wavetable segment is approached.

The process next passes to step 504, which illustrates playing a backup wavetable. The backup wavetable may be a distinct wavetable designated for that purpose in the system memory and employed if the paged segment is not returned in time, or may be formed by looping through the last few samples of the nonpaged wavetable segment, or may be generated algorithmically through processes known in the art. Where some anticipation of underrun is available, the wavetable synthesizer may easily select a point before end of the segment and loop between the selected point and segment end until the paged segment becomes available.

Where the nonpaged segment end is looped to form a backup wavetable, the loop is preferably indexed into the nonpaged wavetable segment at a point which most closely matches the direction and level of the last two point in the nonpaged segment. This alternative would thus smooth the transition between the nonpaged and page segments in cases of underruns. An audible change in timbre would be unavoidable, but the audible pop resulting from suddenly stopping the note would be prevented.

The process next passes to step 506, which illustrates a determination of whether the paged wavetable segment is available. If not, the process returns to step 504 and continues playing the backup wavetable. If so, however, the process may proceed to step 508, which depicts completing the backup wavetable and starting play of the paged wavetable segment. If the sound generated for the backup wavetable differs too much from the wavetable segment being played when the overrun occurred, the synthesizer may simply allow the note to die out rather than extend the incongruous backup wavetable. The process then passes to step 510, which illustrates the process becoming idle until another underrun is detected. It should be noted that detection of an underrun should automatically trigger a recalculation of the maximum paging delay utilized to segment the wavetables.

The present invention allows a large number of wavetables to be paged into and out of memory by locking only a portion of the wavetables in system memory. The remaining portion of the wavetable may be paged into memory as needed or paged out of system memory when no longer required. Larger, higher quality wavetables may thus be employed.

Segmentation of the wavetables into paged and nonpaged portions is automatically tuned for individual system paging delays and for temporal shifts in paging delays within a given system. A margin for error is employed in accounting for paging delays to prevent audio underrun. The margin for error may be aggressively selected where an alternative mechanism for handling underruns is available, such as a backup wavetable played while the paged wavetable segment is unavailable. By forming the backup wavetable by looping the end of the nonpaged wavetable segment, the transition between the two segments is smoothed.

Although described with reference primarily to MIDI files, the present invention may be employed with other audio standards such as MOD files. Additionally, the present invention may also be employed in conjunction with programs or devices designed to download music off the Internet.

It is important to note that while the present invention has been described in the context of a fully functional data processing system, those skilled in the art will appreciate that the mechanism of the present invention is capable of being distributed in the form of a computer readable medium of instructions in a variety of forms, and that the present invention applies equally regardless of the particular type of signal bearing media used to actually carry out the distribution. Examples of computer readable media include: recordable type media such as floppy disks and CD-ROMs and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method of synthesizing a wavetable in a data processing system, comprising:

segmenting the wavetable into a beginning portion and a remaining portion;

page locking the beginning portion of the wavetable in a system memory for immediate synthesis on demand;

storing the remaining portion in a memory page which is paged into and out of the system memory from a storage device;

synthesizing the beginning portion of the wavetable;

after beginning synthesis of the beginning portion, paging the memory page containing the remaining portion of the wavetable into system memory; and synthesizing the remaining portion of the wavetable.

2. The method of claim 1, further comprising:

responsive to completing synthesis of the beginning portion prior to the remaining portion being paged into the memory, synthesizing a backup wavetable sample.

3. The method of claim 2, further comprising:

looping an ending segment of the beginning portion to form the backup sample.

4. The method of claim 1, further comprising:

segmenting a plurality of wavetables into beginning portions and remaining portions;

loading the beginning portions into the system memory for immediate synthesis upon demand; and storing the remaining portions in memory pages which is paged into and out of the system memory.

5. The method of claim 4, wherein each wavetable within the plurality of wavetables contains, without looping, a different note sampled from a piano until decay.

6. The method of claim 1, further comprising:

computing a maximum paging delay; and determining a size of the beginning portion of the wavetable which would accommodate the maximum paging delay, wherein the beginning portion stored within the system memory is at least the determined size.

7. The method of claim 6, further comprising:

measuring a paging delay for paging the memory page containing the remaining portion;

adding a margin for error to the measured paging delay to compute a computed paging delay;

comparing the computed paging delay to the maximum paging delay; and responsive to determining that the computed paging delay differs from the maximum paging delay, segmenting the wavetable into a different beginning portion accommodating the computed paging delay and a different remaining portion.

8. An apparatus for synthesizing a wavetable in a data processing system, comprising:

a wavetable segmented into a beginning portion and a remaining portion;

a system memory containing the beginning portion of the wavetable for immediate synthesis on demand;

a storage device storing the remaining portion in a memory page which is paged into and out of the system memory;

synthesis means for synthesizing the beginning portion of the wavetable stored in said system memory;

memory paging means for paging the memory page containing the remaining portion of the wavetable into the system memory after beginning synthesis of the beginning portion; and synthesis means for synthesizing the remaining portion of the wavetable.

9. The apparatus of claim 8, further comprising:

synthesis means, responsive to completing synthesis of the beginning portion prior to the remaining portion being paged into the memory, for synthesizing a backup wavetable sample.

10. The apparatus of claim 9, further comprising:

means for looping an ending segment of the beginning portion to form the backup sample.

11. The apparatus of claim 8, further comprising:

a plurality of wavetables each segmented into beginning portions and remaining portions, wherein the beginning portions are loaded into the system memory for immediate synthesis upon demand, and the remaining portions are each stored in different memory pages which may be paged into and out of the system memory.

12. The apparatus of claim 11, wherein each wavetable within the plurality of wavetables contains, without looping, a different note sampled from a piano until decay.

13. The apparatus of claim 8, further comprising:

means for computing a maximum paging delay; and means for determining a size of the beginning portion of the wavetable which would accommodate the maximum paging delay, wherein the beginning portion stored within the system memory is at least the determined size.

14. A computer program product for use with a data processing system, comprising:

a computer usable medium;

a wavetable segmented into a beginning portion and a remaining portion;

first instructions on the computer usable medium for page locking the beginning portion of the wavetable in a system memory for immediate synthesis on demand;

second instructions on the computer usable medium for storing the remaining portion in a memory page which is paged into and out of the system memory from a storage device;

third instructions on the computer usable medium for synthesizing the beginning portion of the wavetable;

fourth instructions on the computer usable medium for paging the memory page containing the remaining portion of the wavetable into the system memory after beginning synthesis of the beginning portion; and fifth instructions on the computer usable medium for synthesizing the remaining portion of the wavetable.

15. The computer program product of claim 14, further comprising:

sixth instructions on the computer usable medium for loading a plurality of wavetable segments in the system memory, the plurality of wavetable segments comprising beginning portions of a plurality of different wavetables.

16. The computer program product of claim 15, wherein the sixth instructions further comprise:

instructions for loading the beginning portions of the different wavetables, each wavetable containing, without looping, a different note sampled from a piano until decay.

17. The computer program product of claim 14, further comprising:

instructions on the computer usable medium for computing a maximum paging delay; and instructions on the computer usable medium for determining a size of the beginning portion of the wavetable which would accommodate the maximum paging delay;

instructions on the computer usable medium for storing the beginning portion of the wavetable in a page in the system memory, wherein the beginning portion is at least the size which would accommodate the maximum paging delay.

18. The computer program product of claim 17, further comprising:

instructions on the computer usable medium for storing the remaining portion of the wavetable in a different memory page which is paged into and out of the system memory.

19. The computer program product of claim 14, wherein the computer usable medium comprises a CD-ROM.

20. The computer program product of claim 14, wherein the computer usable medium comprises a transmission from an Internet site.

* * * * *